(12) United States Patent
Osterholm

(10) Patent No.: US 11,905,606 B2
(45) Date of Patent: Feb. 20, 2024

(54) CHLORINE DIOXIDE GAS GENERATING DEVICES, SYSTEMS, AND METHODS

(71) Applicant: CUPOD LLC, Hermitage, PA (US)

(72) Inventor: Wayne Osterholm, New Wilmington, PA (US)

(73) Assignee: CUPOD LLC, Hermitage, PA (US)

( * ) Notice: Subject to any disclaimer, the term of this patent is extended or adjusted under 35 U.S.C. 154(b) by 0 days.

(21) Appl. No.: 18/126,640

(22) Filed: Mar. 27, 2023

(65) Prior Publication Data

US 2023/0304168 A1 Sep. 28, 2023

Related U.S. Application Data

(60) Provisional application No. 63/324,252, filed on Mar. 28, 2022.

(51) Int. Cl.
| | |
|---|---|
| *C25B 1/26* | (2006.01) |
| *C01B 11/02* | (2006.01) |
| *C25B 15/08* | (2006.01) |
| *C25B 9/19* | (2021.01) |
| *A01P 1/00* | (2006.01) |
| *A01N 59/00* | (2006.01) |

(52) U.S. Cl.
CPC .............. *C25B 1/26* (2013.01); *A01N 59/00* (2013.01); *A01P 1/00* (2021.08); *C01B 11/022* (2013.01); *C25B 9/19* (2021.01); *C25B 15/083* (2021.01)

(58) Field of Classification Search
CPC ........................................... C25B 1/26
USPC ........................................ 205/556
See application file for complete search history.

(56) References Cited

U.S. PATENT DOCUMENTS

| | | | | |
|---|---|---|---|---|
| 4,176,032 A | * | 11/1979 | Stevenson, Jr. .... | G01N 33/1886 204/415 |
| 4,683,039 A | * | 7/1987 | Twardowski ............. | C25B 1/26 210/640 |
| 5,932,085 A | * | 8/1999 | Cowley ..................... | C02F 1/76 423/478 |

(Continued)

FOREIGN PATENT DOCUMENTS

WO        WO 01/60750 A2 *  8/2001  ................ C02F 1/00

OTHER PUBLICATIONS

Zhu et al, Preparation and Evaluation of Novel Solid Chlorine Dioxide-based Disinfectant Powder in Single-pack, Biomedical and Environmental Sciences, vol. 21, No. 2, Feb. 2008, pp. 157-162 (Year: 2008).*

(Continued)

*Primary Examiner* — Harry D Wilkins, III
(74) *Attorney, Agent, or Firm* — Powers IP Law

(57) ABSTRACT

A chlorine dioxide gas generating device is provided. The device includes a housing, an anode and a cathode, a first reagent and a second reagent, and a hydrophobic membrane. The housing has a cavity. The anode and the cathode are each coupled to and located within the cavity. The first reagent and the second reagent are each located within the cavity. The first reagent and the second reagent are configured to generate chlorine dioxide gas via electrolysis responsive to an electric current being passed into the anode and the cathode. The hydrophobic membrane is coupled to the housing, and is configured to allow the chlorine dioxide gas to exit the housing while preventing fluids from flowing therethrough.

8 Claims, 5 Drawing Sheets

(56) References Cited

U.S. PATENT DOCUMENTS

| | | | | |
|---|---|---|---|---|
| 5,965,004 A | * | 10/1999 | Cowley | B01D 61/00 423/478 |
| 2002/0185423 A1 | * | 12/2002 | Boyd | C01B 13/10 210/167.3 |
| 2004/0211676 A1 | * | 10/2004 | Herrington | C02F 1/003 205/742 |
| 2010/0189631 A1 | * | 7/2010 | Noszticzius | B01D 71/70 422/240 |

OTHER PUBLICATIONS

McDonald et al., Fabrication of microfluidic systems in poly(dimethylsiloxane), Electrophoresis, vol. 21, No. 1, Jan. 2000, pp. 27-40 (Year: 2000).*

* cited by examiner

CHLORINE DIOXIDE GAS GENERATING DEVICES, SYSTEMS, AND METHODS

CROSS-REFERENCE TO RELATED APPLICATION

This application claims priority to and claims the benefit of U.S. Provisional Patent Application Ser. No. 63/324,252, filed on Mar. 28, 2022.

TECHNICAL FIELD

This patent specification relates to the field of the generation of sanitizing substances. More specifically, this patent specification relates to devices and systems for generating chlorine dioxide gas.

BACKGROUND

Sanitizing substances and processes using sanitizing substances are in constant need. One particularly useful sanitizing substance is Chlorine dioxide gas. Chlorine dioxide gas is unstable and cannot be liquefied or compressed and therefore must be produced on-site for use. Chlorine dioxide on site production is typically generated through an acid-based method by mixing starting materials, such as sodium chlorite and hydrochloric acid, or sodium chlorite and ferric trichloride, or sodium chlorite and chlorine gas. However, these reactants, and methods utilizing them, are expensive and used for large scale production for cost effectiveness and contain impurities that need further filtration for quality and use. Because of the difficulties in generating, transporting, and storing chlorine dioxide gas, the benefits of its use are limited.

Therefore, a need exists for novel chlorine dioxide generating devices and systems. A further need exists for novel devices and systems for chlorine dioxide gas generation that produce highly pure chlorine dioxide gas on demand in a safe and cost-effective manner for personal, business and industrial sanitizing applications.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
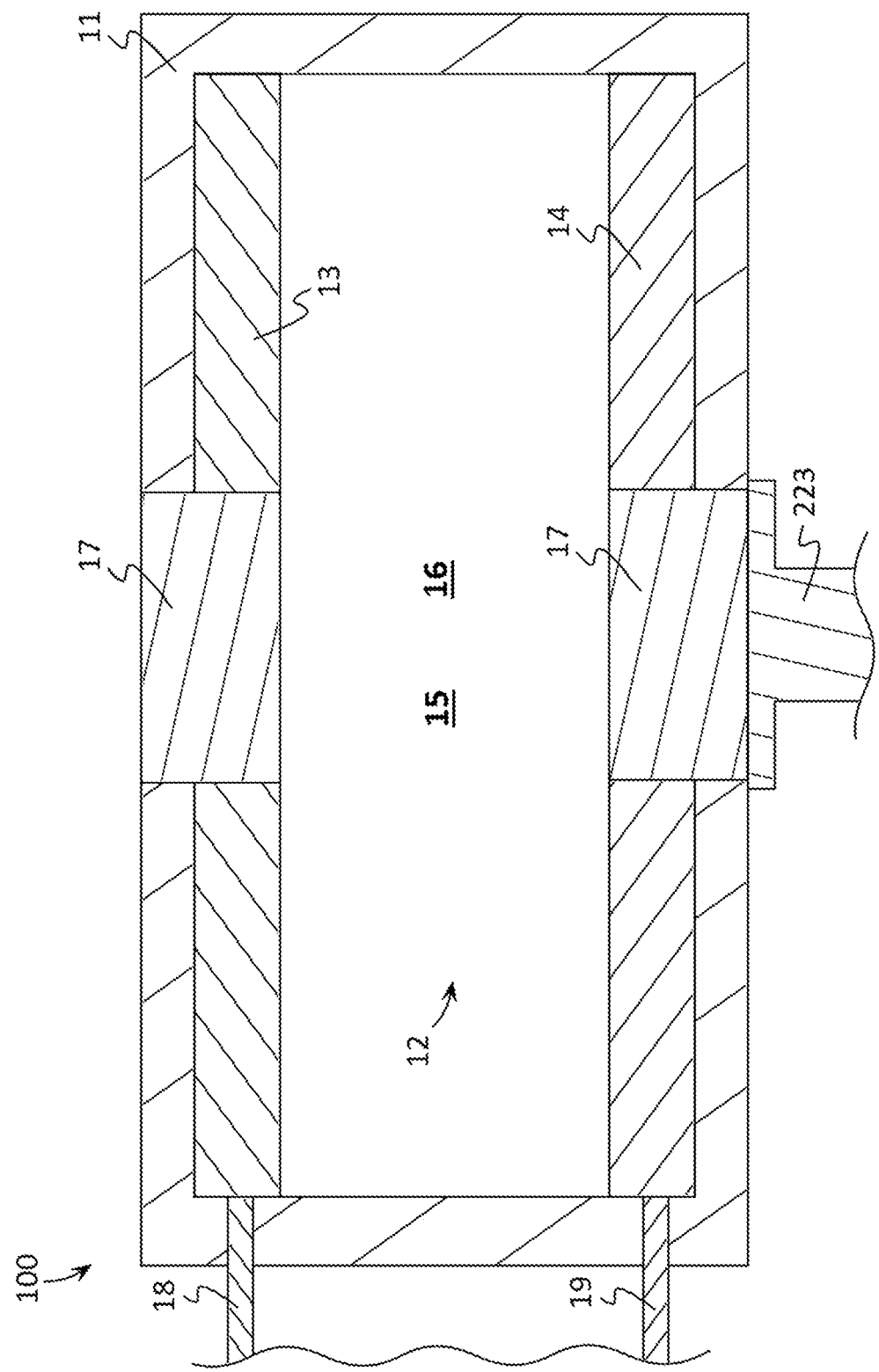
FIG. 1 depicts a sectional view of an example of a chlorine dioxide generating device according to various embodiments described herein.

A chlorine dioxide generating device and system is provided. Preferably, this device and system may utilize a combination of with water (e.g., Type I Ultra-Pure Water) and ACS reagent grade sodium chlorite for chlorine gas generation produces a highly pure, cost effective production, on demand for personal, business and industrial use. By producing controllable on site, on demand, and highly pure chlorine dioxide gas, the device enables a safe production and use of chlorine dioxide gas.

According to one aspect consistent with the principles of the invention, a chlorine dioxide generating device is provided. In some embodiments, the device may include a housing, and the housing may include a cavity. An anode and a cathode may be positioned in and coupled to the cavity so that the anode and cathode are not in contact with each other. A first reagent and a second reagent may be disposed in the cavity so that the first reagent and second reagent each contact both the anode and cathode. The first reagent may comprise water and the second reagent may comprise sodium chlorite which may be mixed to form a solution. By applying electrical current to the device so that the electrical current flows from the anode to the cathode, chlorine dioxide gas may be generated in the cavity via electrolysis. That is, the first and second reagents are configured to generate chlorine dioxide gas via electrolysis responsive to an electric current being passed into the anode and the cathode. In this manner, the anode and the cathode function as a catalyst to facilitate the generation of chlorine dioxide gas. Additionally, the device may include one or more hydrophobic membranes coupled to the housing of the chlorine dioxide generating device, which may enable the chlorine dioxide gas to exit the cavity and housing while keeping the reagents within the cavity (e.g., while preventing fluids from flowing therethrough).

In further embodiments, the device may include a proton exchange membrane which may be positioned in the cavity so that the cathode and anode may be separated by the proton exchange membrane so that the reassurance of separating the chlorine dioxide gas from other impurities is established.

According to another aspect, a chlorine dioxide generating system is provided which may utilize one or more devices to generate chlorine dioxide gas and to deposit the chlorine dioxide gas in a dispensing container to facilitate the use of the chlorine dioxide gas for cleaning, disinfecting, and other purposes. In some embodiments, the system may comprise a chlorine dioxide generating device which may be configured to generate chlorine dioxide gas via electrolysis. A dispensing container may be in communication with the device so that the chlorine dioxide gas may enter a dispensing cavity of the dispensing container. The dispensing cavity may include a liquid, such as water, which the chlorine dioxide gas may be infused or dissolved into. The system may include an activator which may supply electricity to the device to enable electrolysis.

In further embodiments, the system may comprise a dispensing container having a dispensing hydrophobic membrane which may be placed on a device so that the chlorine dioxide gas may pass through a hydrophobic membrane of the device and into the dispensing cavity via the dispensing hydrophobic membrane. Furthermore, the chlorine dioxide gas may be configured to pass directly from the chlorine dioxide gas generating device into the dispensing container without passing through intermediate components (e.g., the device may be sealingly engaged with the dispensing container). An optional vacuum pump may be in communication with the dispensing container and the device, and the vacuum pump draw excess chlorine dioxide gas out of the dispensing container and then recirculate the chlorine dioxide gas into the device and/or dispensing container so as to further concentrate the chlorine dioxide gas into the liquid within the dispensing container.

These and other advantages of the present disclosure are provided in greater detail herein.

Illustrative Embodiments

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new controllable ultra-pure on-demand chlorine dioxide generating device and system are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 2:
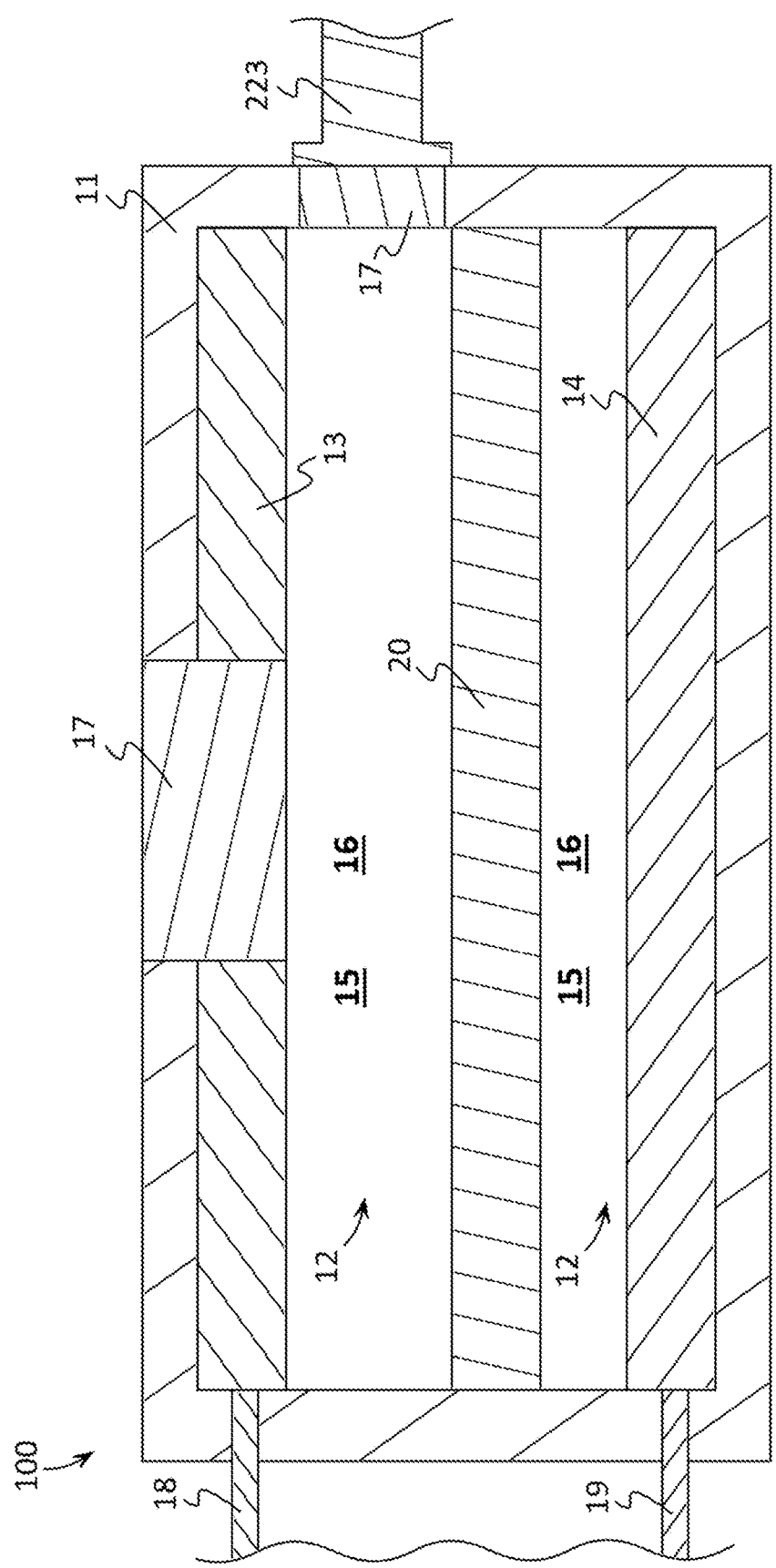
FIG. 2 illustrates a sectional view of another example of a chlorine dioxide generating device according to various embodiments described herein.
Figure 3:
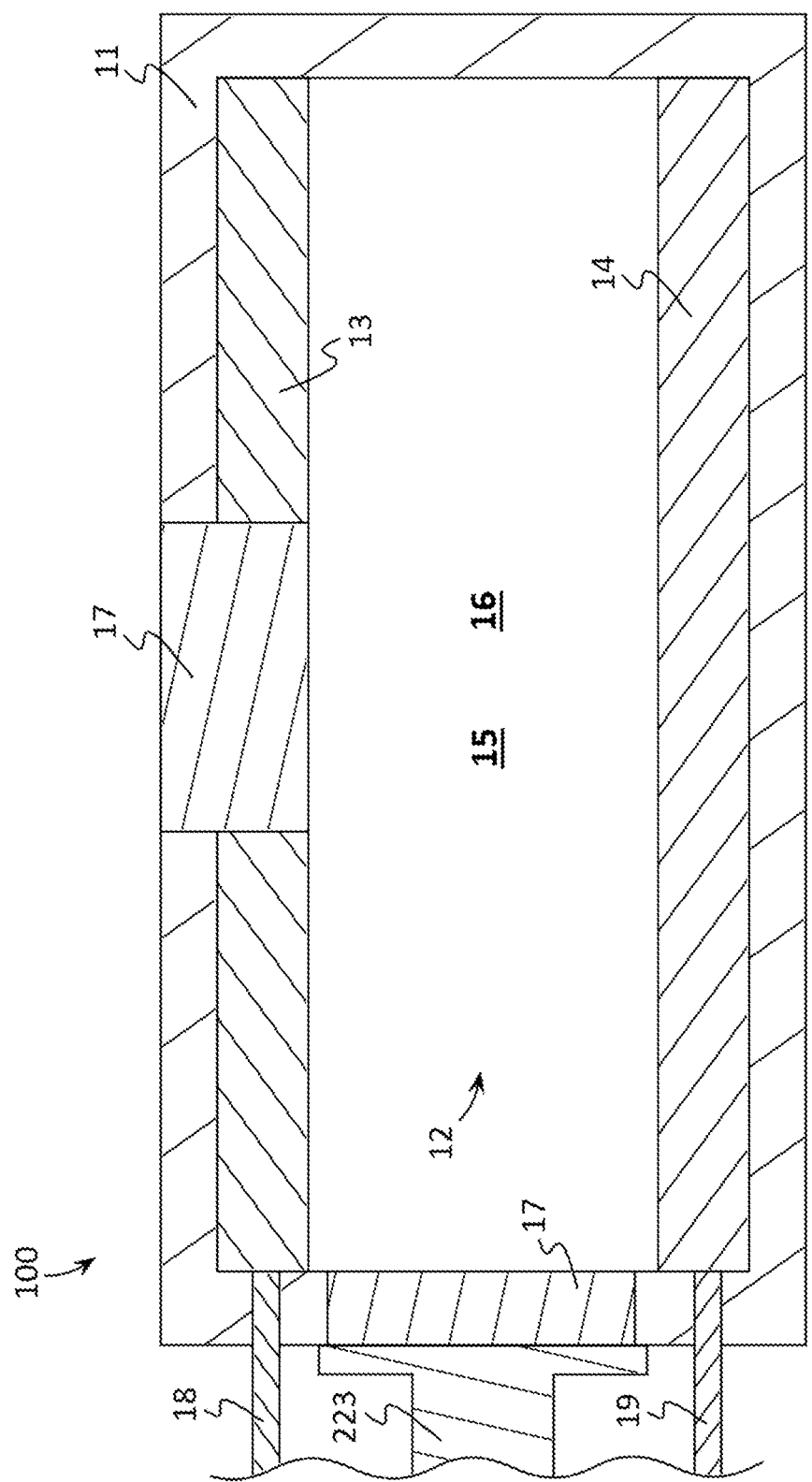
FIG. 3 shows a sectional view of yet another example of a chlorine dioxide generating device according to various embodiments described herein.

The present invention will now be described by example and through referencing the appended figures representing preferred and alternative embodiments. FIGS. 1-3 illustrate examples of a chlorine dioxide generating device ("the device") 100 according to various embodiments. The device 100 may be used to generate ultra-pure chlorine dioxide gas in a controllable and on-demand manner. In some embodiments, the device 100 may comprise a housing 11. The housing 11 may include a cavity 12. An anode 13 and a cathode 14 may be positioned in the cavity 12 so that the anode 13 and cathode 14 are not in contact with each other. A first reagent 15 and a second reagent 16 may be disposed in the cavity 12 so that the first reagent 15 and second reagent 16 each contact both the anode 13 and cathode 14. The first reagent 15 may comprise water and the second reagent 16 may comprise sodium chlorite which may be mixed to form a solution. By applying electrical current to the device 100 so that the electrical current flows from the anode 13 to the cathode 14, chlorine dioxide gas may be generated in the cavity 12 via electrolysis. The device 100 may include one or more hydrophobic membranes which may enable the chlorine dioxide gas to exit the cavity 12 and housing 11 while keeping the reagents 15, 16, within the cavity 12.

The device 100 may comprise a housing 11 which may be configured in any shape and size. For example, a housing 11 may range in size from approximately the size of a dime to industrial sizes needed for safe on demand chlorine dioxide gas at a controlled rate. Generally, a housing 11 may form the cavity 12 may also function as a structure to which the anode 13, cathode 14, and other elements of the device 100 may be directly or indirectly coupled to. In some embodiments, a housing 11 may be configured in a generally cylindrical shape. In other embodiments, a housing 11 may be configured in a generally rectangular prism shape, a hexagonal prism shape, or any other shape, including combinations of shapes.

Preferably, a housing 11 may be made from or may comprise substantially rigid materials that are not conductive to electricity, including glass, such as borosilicate glass or Pyrex®, ceramics such as alumina, porcelain, and boron carbide, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, or any other material including combinations of materials that are substantially rigid and suitable for securing and positioning a heat exchange element 112 to a seating element 111.

A cavity 12 may be formed or disposed in the housing 11, and the cavity 12 may be sized and shaped to that all or portions of the anode 13 and cathode 14 may be positioned within the cavity 12 while also being separated form each other. Additionally, the cavity 12 may be sized and shaped to accommodate desired amounts of a first reagent 15 and second reagent 16 so that the reagents 15, 16, may each contact both the anode 13 and cathode 14. In some embodiments, a cavity 12 may be configured in a generally cylindrical shape, a generally rectangular prism shape, a hexagonal prism shape, or any other shape, including combinations of shapes.

The device 100 may comprise an anode 13 and a cathode 14 which may be used to perform electrolysis on the reagents 15, 16, within the cavity 12. In preferred embodiments, an anode 13 and/or a cathode 14 may be made from or may comprise Electrolysis Platinum coated Titanium. In other embodiments, an anode 13 and/or a cathode 14 may be made from or may comprise material that may be suitable for performing electrolysis on reagents 15, 16, to generate chlorine dioxide gas. Optionally, the device 100 may comprise one or more leads, such as an anode lead 18 and/or a cathode lead 19, which may be made of or may comprise an electrically conductive material, such as copper, aluminum, brass, etc., that may be cheaper than the material used to form the anode 13 and/or cathode 14. In one example, the anode 13 and the cathode 14, and associated leads may have a minimum electrical conductivity of 5.96*10^7σ, at 20 degrees C. (S/m). It will also be appreciated that the anode 13 and the cathode 14, and associated leads 18,19 may be made of suitable materials that do not corrode in the presence of, or that are wear-resistant to, sodium chlorite, including, for example and without limitation, plutonium, titanium, gold, graphene (e.g., and also including other nano-technology based materials), and graphite, each of which may be more wear resistant to sodium chlorite than copper, aluminum, and brass. An anode lead 18 and a cathode lead 19 may be used to direct and conduct power from a power supply or power supplying device to an anode 13 and cathode 14, respectively, and may be configured in any length, gauge, size, so as to enable this function.

The device 100 may comprise one or more reagents, such as a first reagent 15 and a second reagent 16, which may undergo electrolysis in the cavity 12. The first reagent 15 may comprise water and the second reagent 16 may comprise sodium chlorite which may be mixed to form a solution. In preferred embodiments, a first reagent 15 may comprise Type I Ultra-Pure Water, as defined by the American Society for Testing and Materials, and a second reagent 16 may comprise ACS Reagent grade sodium chlorite. In further embodiments, a first reagent 15 may comprise aqueous sodium chloride or saturated saline and a second reagent 16 may comprise sodium hypochlorite.

In some embodiments, the device 100 may comprise a hydrophobic membrane 17 which may be configured to prevent water from exiting the cavity, while also allowing hydrophobic materials such as chlorine dioxide gas to pass through the hydrophobic membrane 17. A hydrophobic membrane 17 may comprise any suitable hydrophobic membrane. In preferred embodiments, a hydrophobic membrane 17 may comprise a hydrophobic membrane made by Porex, such as the Porex Virtek PTFE protection vent, PMV10L with the 7 mm OD and 3 mm ID. It should be understood that a hydrophobic membrane 17 may be configured in any size and shape depending on device 100 output requirements.

In some embodiments, a hydrophobic membrane 17 may be in fluid communication with the cavity 12 and configured to allow chlorine dioxide gas to exit the cavity 12, such as for collection of the chlorine dioxide gas in a container or vessel. In further embodiments, a hydrophobic membrane 17 may be in fluid communication with the cavity 12 and configured to allow chlorine dioxide gas to enter the cavity 12, such as to allow chlorine dioxide gas to be recirculated through the device 100 for concentrating purposes. Hydrophobic membrane(s) 17 are not required, but may be needed for the containment and production of chlorine dioxide gas, as a hydrophobic membrane 17 retains the liquid while allowing the generated chlorine dioxide gas to escape.

In some embodiments, the device 100 may comprise a proton exchange membrane (PEM) 20. In preferred embodiments, a proton exchange membrane may be positioned in the cavity 12 so that the cathode 14 and anode 13 may be separated by the proton exchange membrane 20 so that the reassurance of separating the chlorine dioxide gas from other impurities is established. In preferred embodiments, a proton exchange membrane 20 may be or may comprise a Nafion 211. Proton Exchange Membrane. PEMs can be made from either pure polymer membranes or from composite membranes, where other materials are embedded in a polymer matrix. One of the most common and commercially available PEM materials is the fluoropolymer (PFSA) Nafion, a DuPont product. While Nafion is an ionomer with a perfluorinated backbone like Teflon, there are many other structural motifs used to make ionomers for proton-exchange membranes. Many use polyaromatic polymers, while others use partially fluorinated polymers.

FIG. 1 shows an example of a device 100 according to various embodiments. In this and in some embodiments, the device 100 may comprise a cavity 12 having an anode 13 and a cathode 14 at opposite ends of the cavity 12. A first reagent 15 comprising Type I Ultra-Pure Water and a second reagent 16 comprising ACS Reagent grade sodium chlorite may be disposed in the cavity 12 to contact the anode 13 and cathode 14. The anode 13 may comprise a first hydrophobic membrane 17 and the cathode 14 may optionally comprise a second membrane 17. Electricity may be supplied to the anode 13 and cathode 14 via an anode lead 18 and a cathode lead 19, respectively, to generate chlorine dioxide gas via electrolysis of the reagents 15, 16. The chlorine dioxide gas may pass through the first hydrophobic membrane 17 to exit the device 100. In further embodiments, chlorine dioxide gas may be recirculated through the device 100 by being communicated through the second hydrophobic membrane 17 via a gas conducting conduit 223. In this manner, the second hydrophobic membrane 17 is configured to allow the chlorine dioxide gas to re-enter the cavity and be reconcentrated therein.

FIG. 2 depicts another example of a device 100 according to various embodiments. In this and in some embodiments, the device 100 may comprise a cavity 12 having an anode 13 and a cathode 14 at opposite ends of the cavity 12. A first reagent 15 comprising Type I Ultra-Pure Water and a second reagent 16 comprising ACS Reagent grade sodium chlorite may be disposed in the cavity 12 to contact the anode 13 and cathode 14. The anode 13 may comprise a first hydrophobic membrane 17 and the cathode 14 may optionally comprise a second membrane 17. A proton exchange membrane 20 may be positioned in (e.g., coupled to and located in) the cavity 12 so that the anode 13 and cathode 14 are separated by the proton exchange membrane 20 in order to ensure that the chlorine dioxide gas is separated from impurities before exiting the housing 11. Electricity may be supplied to the anode 13 and cathode 14 via an anode lead 18 and a cathode lead 19, respectively, to generate chlorine dioxide gas via electrolysis of the reagents 15, 16. The chlorine dioxide gas may pass through the first hydrophobic membrane 17 to exit the device 100. In further embodiments, chlorine dioxide gas may be recirculated through the device 100 by being communicated through the second hydrophobic membrane 17 via gas conducting conduit 223 and may then exit the device 100 via the first hydrophobic membrane 17.

FIG. 3 illustrates yet another example of a device 100 according to various embodiments. In this and in some embodiments, the device 100 may comprise a cavity 12 having an anode 13 and a cathode 14 at opposite ends of the cavity 12. A first reagent 15 comprising Type I Ultra-Pure Water and a second reagent 16 comprising ACS Reagent grade sodium chlorite may be disposed in the cavity 12 to contact the anode 13 and cathode 14. The anode 13 may comprise a first hydrophobic membrane 17 and a second membrane 17 may be disposed in the housing 11. Electricity may be supplied to the anode 13 and cathode 14 via an anode lead 18 and a cathode lead 19, respectively, to generate chlorine dioxide gas via electrolysis of the reagents 15, 16. The chlorine dioxide gas may pass through the first hydrophobic membrane 17 to exit the device 100. In further embodiments, chlorine dioxide gas may be recirculated through the device 100 by being communicated through the second hydrophobic membrane 17 via gas conducting conduit 223.

Figure 4:
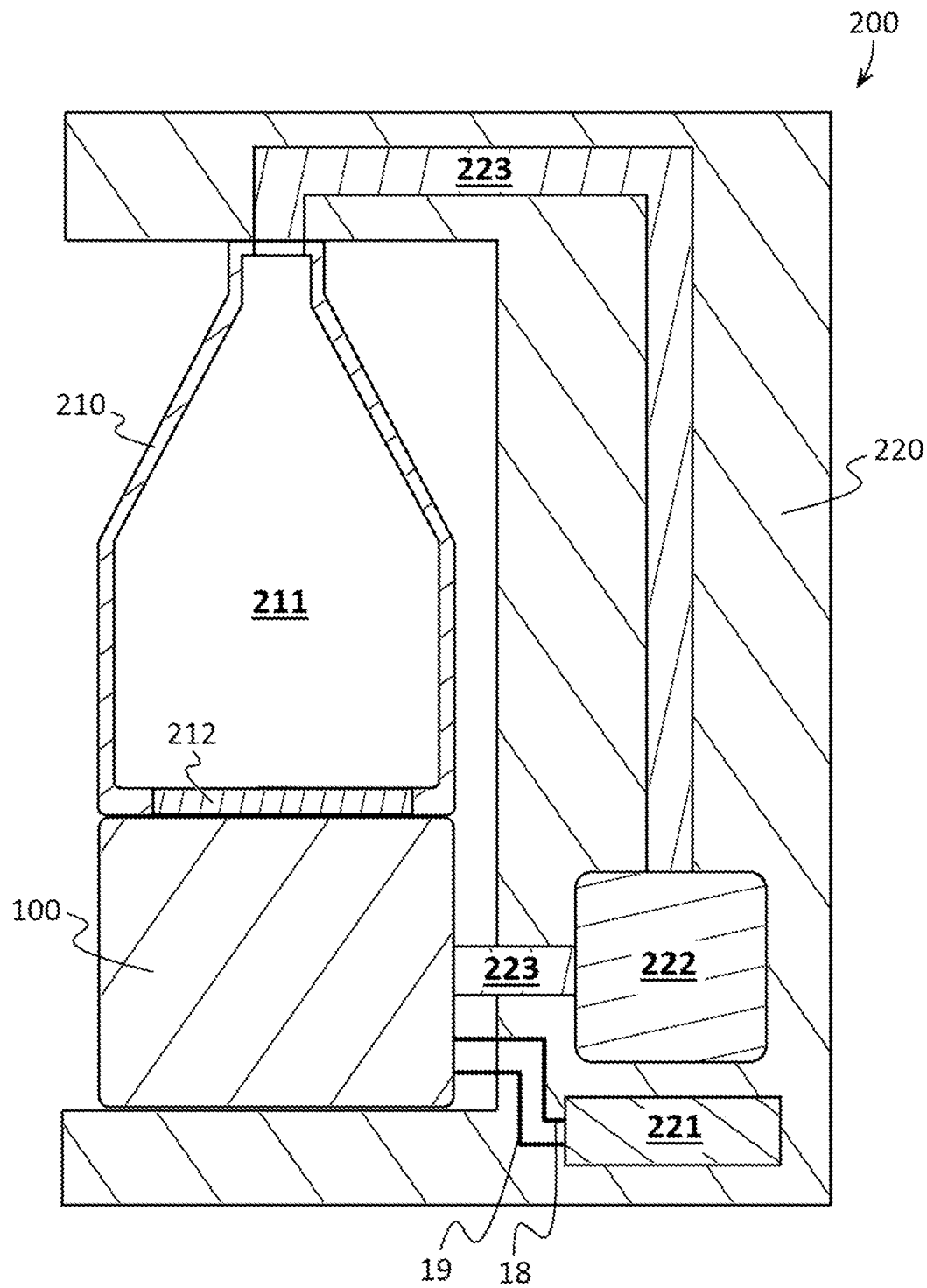
FIG. 4 depicts a schematic diagram of an example of a chlorine dioxide generating system according to various embodiments described herein.

FIG. 4 depicts an example of a chlorine dioxide generating system ("the system") 200 according to various embodiments. Generally, the system 200 may utilize one or more devices 100 to generate chlorine dioxide gas and to deposit the chlorine dioxide gas in a dispensing container 210 to facilitate the use of the chlorine dioxide gas for cleaning, disinfecting, sanitizing, oxidant of water, sterilization, oxidizing and other purposes.

In some embodiments, the system 200 may comprise a device 100 which may be configured to generate chlorine dioxide gas via electrolysis. A dispensing container 210 may be in communication with the device 100 so that the chlorine dioxide gas may enter a dispensing cavity 211 of the dispensing container 210. The dispensing cavity 211 may include a liquid, such as water, which the chlorine dioxide gas may be infused into. The system 200 may include an activator 220 which may supply electricity to the anode lead 18 and cathode lead 19 of the device 100 to enable electrolysis. In preferred embodiments, the system 200 may comprise a dispensing container 210 having a body and a dispensing hydrophobic membrane 212 which may be coupled to the body and placed on a device 100 so that the chlorine dioxide gas may pass through a hydrophobic membrane 17 of the device 100 and into the dispensing cavity 211 via the dispensing hydrophobic membrane 212. In other words, the hydrophobic membrane 212 may be configured to receive the chlorine dioxide gas from the device 100 therethrough. In other embodiments, a device 100 may be placed within the dispensing cavity 211 and into a liquid, such as water, which the chlorine dioxide gas may be infused into. The system 200 may include an activator 220 which may supply electricity to the anode lead 18 and cathode lead 19 of the device 100 to enable electrolysis so that the chlorine dioxide gas produced in the dispensing cavity 211 may be infused into the liquid within the dispensing cavity 211.

A system 200 may comprise one or more dispensing containers 210 which may be configured to contain a liquid, and be used to contain chlorine dioxide gas produced by a device 100. Each dispensing container 210 may include a dispensing cavity 211 that may be configured to hold or contain a desired volume of a liquid, such as water, into which chlorine dioxide gas may be dissolved or infused. A dispensing container 210 may be configured in any shape and size so as to have a dispensing cavity 211 of any shape and size. In preferred embodiments, a dispensing container 210 may be configured generally as a spray bottle preferably having threading or other removable coupling method disposed along its upper portions. This may allow the dispensing container 210 to be removably coupled to a spray nozzle, lid, portions of an activator 220, or other objects. It should be understood that a dispensing container 210 may be configured as any type of container preferably suitable for being held or manipulated by an individual.

A dispensing container 210 may be made from or may comprise substantially rigid materials, such as metal and metal alloys, hard plastics, including polyethylene (PE), Ultra-high-molecular-weight polyethylene (UHMWPE, UHMW), polypropylene (PP) and polyvinyl chloride (PVC), polycarbonate, nylon, hard rubbers; cushioning materials, such as silicone foams, rubber foams, urethane foams including plastic foams, neoprene foam, latex foam rubber, polyurethane foam rubber, or elastomer materials such as elastic plastics, elastic silicone, elastic rubbers; and/or any other material including combinations of materials.

In preferred embodiments, a dispensing container 210 may comprise a dispensing hydrophobic membrane 212 that may be disposed on lower portions of the dispensing container 210 and which may be in communication with the dispensing cavity 211. The hydrophobic membrane 212 may be configured to receive the chlorine dioxide gas therethrough in order to produce a cleaning solution with the liquid therein. This may allow the dispensing container 210 to be placed on or supported on a device 100 so that the hydrophobic membrane 17 of the device 100 and the dispensing hydrophobic membrane 212 of the dispensing container 210 are aligned to allow chlorine dioxide gas to pass from the device 100 into the dispensing cavity 211 via the hydrophobic membranes 17, 212. By positioning a hydrophobic membrane 212 on lower portions of a dispensing container 210, a liquid in the dispensing cavity 211 may rest on the hydrophobic membrane 212 so that as chlorine dioxide gas passes into the dispensing cavity 211 it may flow through the liquid to dissolve into the liquid. A dispensing hydrophobic membrane 212 may comprise any suitable hydrophobic membrane, such as which may be used to from a hydrophobic membrane 17 of a device 100.

An activator 220 may comprise a power source 221 which may be configured to supply electricity to the device 100, such as via an anode lead 18 and cathode lead 19, so that the device 100 may perform electrolysis on the reagents 15, 16, within the device 100 to produce chlorine dioxide gas. In some embodiments, a power source 221 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 221 may comprise a power cord, transformer, kinetic or piezo electric battery charging device, a solar cell or photovoltaic cell, and/or inductive charging or wireless power receiver. In further embodiments, a power source 221 may comprise a power charging and distribution module which may be configured to control the recharging of the power source 221, discharging of the power source 221, and/or distribution of power to one or more components of the device 100 and system 200 that may require electrical power.

Figure 5:
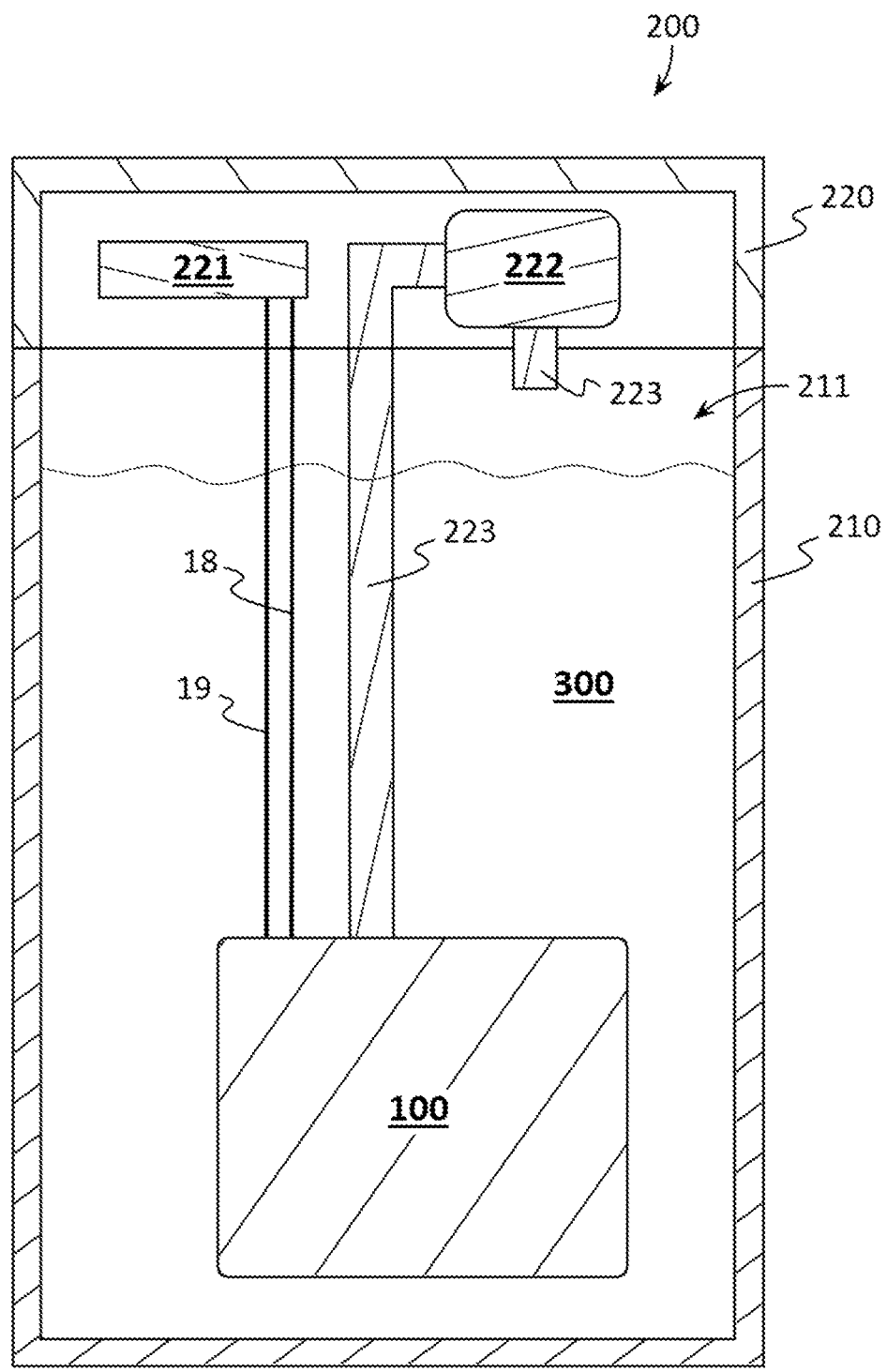
FIG. 5 depicts a schematic diagram of another example of a chlorine dioxide generating system according to various embodiments described herein.

An activator 220 may be configured in any size and shape. In preferred embodiments and as shown in FIG. 4, an activator 220 may comprise a relatively larger size so as to provide a platform upon which a device 100 may be placed or supported while also allowing a dispensing container 210 to be placed or supported on the device 100. The dispensing container 210 may be in fluid communication with the chlorine dioxide gas generating device 100, and may be configured to receive the chlorine dioxide gas after the chlorine dioxide gas has exited the device 100. A larger sized activator 220 may also allow one or more optional components of the system 200 to be placed within the activator 220. In further embodiments and as shown in FIG. 5, an activator 220 may comprise a relatively smaller size so as to allow the activator 220 to be coupled to a dispensing container 210 as a lid while the device 100 may be placed inside a dispensing cavity 211 of the dispensing container 210. In this manner, the device 100 may infuse a liquid 300, such as water, within the dispensing cavity 211 with chlorine dioxide gas. For example, this may allow the system 200 to be used to optionally make sanitizer or disinfectant to apply to surfaces and optionally to generate chlorine dioxide gas in a water liquid 300 from questionable water sources to render the water liquid 300 drinkable. In the embodiment of FIG. 5, the dispensing container 210 is configured to contain a liquid, and the chlorine dioxide gas generating device 100 is located inside the dispensing container 210 such that the chlorine dioxide gas generating device 100 is submerged by the liquid.

Preferably, an activator 220 may be made from or may comprise substantially rigid materials, such as metal and metal alloys, hard plastics, including polyethylene (PE), Ultra-high-molecular-weight polyethylene (UHMWPE, UHMW), polypropylene (PP) and polyvinyl chloride (PVC), polycarbonate, nylon, hard rubbers, wood, other plant based materials; cushioning materials, such as silicone foams, rubber foams, urethane foams including plastic foams, neoprene foam, latex foam rubber, polyurethane foam rubber, or elastomer materials such as elastic plastics, elastic silicone, elastic rubbers; and/or any other material including combinations of materials.

In some embodiments, an activator 220 may comprise a vacuum pump 222 which may be in communication with a device 100 and a dispensing container 210. The vacuum pump 222 may be configured to draw a portion of the chlorine dioxide gas received in the dispensing container first into the chlorine dioxide gas generating device 100, and then back into the dispensing container 210 in order to concentrate the chlorine dioxide gas in the liquid in the dispensing container 210. A vacuum pump 222 may be configured to create a vacuum in the dispensing cavity 211 of a dispensing container 210 which may draw chlorine dioxide gas that has not been dissolved in a liquid in the dispensing cavity 211 out of the dispensing cavity 211. This chlorine dioxide gas may then be recirculated into the dispensing cavity 211, preferably by being recirculated into the device 100 and then into the dispensing cavity 211 via the hydrophobic membranes 17, 212. In this manner, the vacuum pump 222 may be used to concentrate chlorine dioxide gas within the liquid in the dispensing cavity 211.

In some embodiments, an activator 220 may comprise one or more gas conducting conduits 223 which may be used to communicate chlorine dioxide gas, air, and other materials from a dispensing container 210 to be recirculated through a device 100 and/or the dispensing container 210 as motivated by a vacuum pump 222. Gas conducting conduits 223 may be in fluid communication with the dispensing container 210 and the vacuum pump 222 in order to allow the vacuum pump to pull the chlorine dioxide gas from the dispensing container 210 into the chlorine dioxide gas generating device 100. Conducting conduits 223 may comprise any type of pipe or conduit suitable for contacting chlorine dioxide gas, such as Polyurethane tubing and fittings, Poly Vinyl Chloride (PVC) pipe and fittings, Chlorinated Poly Vinyl Chloride (CPVC) pipe and fittings, cross-linked polyethylene (PEX) pipe and fittings, polyethylene pipe and fittings, vinyl pipe and fittings, or any other suitable type of pipe or conduit.

A vacuum pump 222 may comprise any device which may be suitable for motivating chlorine dioxide gas. In preferred embodiments, a vacuum pump 222 may comprise a miniature vacuum pump, such as a 100 KPa 5V-6V DC Miniature Vacuum Pump with a 370 motor. In further embodiments, a vacuum pump 222 may comprise a magnetic drive pump, positive displacement pump such as a rotary vane pump, a liquid ring pump, a piston pump, a scroll pump, a screw pump, a Wankel pump, an external vane pump, a roots blower or booster pump, a multistage roots pump, a Toepler pump, a lobe pump, or any other suitable positive displacement pump. In alternative embodiments, a vacuum pump 222 may comprise a momentum transfer pump, a regenerative pump, a venturi vacuum pump, an entrapment pump, or any other type of pump which may be suitable for motivating chlorine dioxide gas through a device 100 and/or dispensing container 210. Optionally, a vacuum pump 222 may comprise a motor driven vacuum generating device such as a blower fan, a vane pump, a diaphragm pump, a liquid ring pump, a piston pump, a scroll pump, a screw pump, a Wankel pump, a roots blower or booster pump, a multistage roots pump, a Toepler pump, a lobe pump, or other suitable pump may be used.

Example Implementation

In detail, chlorine dioxide gas was made from 10 grams ACS Reagent grade sodium chlorite (second reagent 16) and 50 mm Type I Ultra-Pure Water (first reagent 15) as defined by the American Society for Testing and Materials (ASTM) as having a resistivity of >18 Me-cm, a conductivity of <0.056 µS/cm and <50 ppb of Total Organic Carbons (TOC). A measured amount was created and filled into a small electro-bath cartridge. The electrolysis was operated by 5 V and 1 A current. During electrolysis, the chlorine dioxide gas was released from the device 100 using a hydrophobic membrane 17 at a rate of 0.05 ppm. This provides for the ability to control the ppm of ultrapure chlorine dioxide gas generation to be controlled and specific by a ratio of Type I Ultra-Pure Water to ACS Reagent Grade sodium chlorite and voltage and amp regulation above 1.5 V and under 1 A multiplied by time for specific ppm use. It will also be appreciated that other suitable voltage and amperage combinations are contemplated herein to perform the desired electrolysis function based on the output needs, associated materials, and reagents used.

Release of chlorine dioxide gas was into a chamber of Ultra-Pure Water to make a solution chlorine dioxide gas for selected uses. The chemical composition of the chlorine dioxide gas solution was determined according to a standard method based on the final product output and use. The resulting solution contained 0.05 ppm $ClO_2$. The total impurities concentration is significantly lower than in the case of other $ClO_2$ generators because the first reagent 15 did not contain any sodium chloride (NaCl) or other contaminants in the water. The chlorine dioxide solution was produced by using only measured % $NaClO_2$ in solution with Type I water Ultra-Pure Water, with no other additive, which is an obvious advantage.

Electrolysis of Ultra-Pure Water has a conductivity of 18.24 MΩ cm requires excess energy in the form of over-potential to overcome various activation barriers. Without the excess energy the electrolysis of ultra-pure water occurs very slowly or not at all. This is in part due to the limited self-ionization of water. Ultra-Pure water has an electrical conductivity about one millionth that of seawater.

By adding the ACS reagent grade sodium chlorite as the second reagent 16 into a first reagent 15 of Type I Ultra-Pure Water to form a solution, electrolysis can occur, even at a low current level. This electrolysis is acting as the catalyst in the solution of Type I Ultra-Pure Water and ACS Reagent grade sodium chlorite, and the generation of chlorine dioxide gas is from the anode 18 side of the electrolytic method. Since little or no electrolytic activity occurs on the cathode 19 side, very little impurities are generated. By separating the cathode 19 and anode 18 with a Proton Exchange Membrane (PEM) 20, the reassurance of separating the chlorine dioxide gas from impurities is established. Based on end users' needs and purity level, the PEM 20 may or may not be required.

While some exemplary shapes and sizes have been provided for elements of the device 100, it should be understood to one of ordinary skill in the art that a housing 11, cavity 12, anode 13, cathode 14, hydrophobic membrane 17, proton exchange membrane 20, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

In another example, a method of producing a cleaning solution with the system 200 includes the steps of passing an electric current from the power source 221 into the anode 13 and the cathode 14, and in response, generating chlorine dioxide gas via electrolysis with the first and second reagents 15,16; delivering the chlorine dioxide gas from the chlorine dioxide gas generating device 100 into the dispensing container 210; and infusing substantially all of the chlorine dioxide gas into the liquid in the dispensing container 210 in order to produce the cleaning solution. The method may further include passing the chlorine dioxide gas through a hydrophobic membrane 17 of the chlorine dioxide gas generating device 100, passing the chlorine dioxide gas through a hydrophobic membrane 212 of the dispensing container 210. The method may also include drawing a portion of the chlorine dioxide gas in the dispensing container 210 back into the chlorine dioxide gas generating device 100 with the vacuum pump 222, and drawing the portion of the chlorine dioxide gas from the chlorine dioxide gas generating device 100 back into the dispensing container 210 in order to concentrate the cleaning solution. Moreover, as shown in FIG. 5, the method may also include submerging the chlorine dioxide gas generating device 100 in the liquid of the dispensing container 210.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A chlorine dioxide gas generating system comprising:
   an activator comprising a power source;
   a chlorine dioxide gas generating device comprising an anode, a cathode, a housing having a cavity, and a first hydrophobic membrane coupled to the housing, the chlorine dioxide gas generating device being configured to generate chlorine dioxide gas in an on-demand manner responsive to an electric current being passed into the anode and the cathode from the power source; and
   a dispensing container in fluid communication with the chlorine dioxide gas generating device, the dispensing container being configured to receive the chlorine dioxide gas after the chlorine dioxide gas has exited the chlorine dioxide gas generating device,
   wherein the dispensing container comprises a body and a second hydrophobic membrane coupled to the body; and
   wherein the second hydrophobic membrane of the dispensing container is configured to receive the chlorine dioxide gas from the chlorine dioxide gas generating device therethrough after the chlorine dioxide gas has passed through the first hydrophobic membrane.

2. The chlorine dioxide gas generating system according to claim 1, wherein the dispensing container is configured to contain a liquid; wherein the activator further comprises a vacuum pump configured to draw a portion of the chlorine dioxide gas received in the dispensing container first into the chlorine dioxide gas generating device, and then back into the dispensing container in order to concentrate the chlorine dioxide gas in the liquid in the dispensing container.

3. The chlorine dioxide gas generating system according to claim 2, wherein the activator further comprises a gas conducting conduit in fluid communication with the dispensing container and the vacuum pump in order to allow the vacuum pump to pull the chlorine dioxide gas from the dispensing container into the chlorine dioxide gas generating device.

4. The chlorine dioxide gas generating system according to claim 1, wherein the chlorine dioxide gas is configured to pass directly from the chlorine dioxide gas generating device into the dispensing container without passing through intermediate components.

5. The chlorine dioxide gas generating system according to claim 1, wherein the chlorine dioxide gas generating device further comprises a first reagent and a second reagent; wherein the first reagent and the second reagent are each disposed within a cavity of a housing and are configured to generate the chlorine dioxide gas via electrolysis; wherein the first hydrophobic membrane is coupled to the housing; wherein the anode and the cathode are coupled to and disposed within the cavity; and wherein the first hydrophobic membrane is configured to allow the chlorine dioxide gas to exit the housing while preventing liquids from flowing therethrough.

6. The chlorine dioxide gas generating system according to claim 5, wherein the first and second reagents are each encapsulated within the cavity of the housing.

7. The chlorine dioxide gas generating system according to claim 1, wherein the dispensing container is configured to contain a liquid; and wherein the chlorine dioxide gas generating device is disposed inside the dispensing container such that the chlorine dioxide gas generating device is submerged by the liquid.

8. The chlorine dioxide gas generating system according to claim 1, wherein the first hydrophobic membrane is coupled to an exterior of the housing, wherein the first hydrophobic membrane comprises a first surface and a second surface disposed opposite the first surface, wherein the first surface faces the cavity and the second surface faces away from the cavity, and wherein, responsive to the electric current being passed into the anode and the cathode, the chlorine dioxide gas exits the housing through the second surface.

* * * * *